United States Patent [19]
Kosaka

[11] 4,340,950
[45] Jul. 20, 1982

[54] VIDEO DISC PLAYER

[75] Inventor: Minoru Kosaka, Tokorozawa, Japan

[73] Assignee: Universal Pioneer Corporation, Tokyo, Japan

[21] Appl. No.: 196,148

[22] Filed: Oct. 10, 1980

[30] Foreign Application Priority Data

Oct. 12, 1979 [JP] Japan .................................. 54-131494
Oct. 12, 1979 [JP] Japan .................................. 54-131495
Oct. 13, 1979 [JP] Japan .................................. 54-132285

[51] Int. Cl.³ ........................ G11B 21/10; H04N 5/76
[52] U.S. Cl. ........................................ 369/44; 369/124; 358/128.5; 360/77; 360/65; 250/202
[58] Field of Search ................... 369/44, 43, 124, 46; 358/128.5, 127, 174; 360/77, 65, 67, 27, 28; 250/201, 202; 318/577

[56] References Cited

U.S. PATENT DOCUMENTS

| 3,906,152 | 9/1975 | Hoogendijk | 358/128.5 |
| 4,138,663 | 2/1979 | Lehureau | 365/215 |
| 4,165,495 | 8/1979 | Takahashi | 369/111 |
| 4,234,837 | 11/1980 | Winslow | 250/202 |

Primary Examiner—Bernard Konick
Assistant Examiner—Alan Faber
Attorney, Agent, or Firm—Michael J. Striker

[57] ABSTRACT

A video disc player featuring a signal correcting device capable of compensating for the attenuation of the signal level of high frequency components of the reproducing signal read out from an optically electromagnetically or electrostatically scanned video disc, a device for detecting the presence or absence of recorded information on a video disc being played back, or a tracking servo system which can be locked in reliably and in a stable condition when the servo loop is to be closed from an open condition.

13 Claims, 16 Drawing Figures

VIDEO DISC PLAYER

FIELD OF THE INVENTION

The present invention relates in general to an apparatus for reading and reproducing the information recorded on a video disc of, for example, the type in which the information recorded thereon is to be read out in an optical fashion. Particularly, the present invention relates to a reproducing signal correcting device for use in a video-disc information reading and reproducing apparatus and further to a device for detecting the presence or absence of recorded information on a video disc being scanned in a video-disc information reading and reproducing apparatus including such a reproducing signal correcting device. Yet, the present invention is further concerned with a tracking servo system for use in a video-disc reading and reproducing apparatus.

BACKGROUND OF THE INVENTION

In a video disc presently in use for a video disc player, video and audio information is stored in a multiplex form consisting of a video signal carrier which is frequency modulated with a standard NTSC (National Television System Committee of U.S.A.) video signal and two-channel audio signal carriers each of which is frequency modulated with an audio signal. The video signal carrier is higher in frequency than the audio signal carriers and is superposed in the form of pulsewidth modulation on the audio signal carriers in the multiplex signal recorded on the video disc.

In the case of a video disc of the optically scanned type, the multiplex signal thus consisting of the frequency modulated video and audio signal carriers superposed on each other is stored as a series of depressed areas or "pits" formed in each or one information-carrying face of the video disc and arranged in a spiral track or a number of concentric tracks about the center axis of the disc. The video and audio information thus stored is read out by optically scanning the individual pits along the spiral track or each of the concentric tracks by means of a beam of laser light and thereby detecting the lengths of and spacings between the scanned pits. During playback of such a video disc, the disc is driven for rotation about the center axis thereof usually at a fixed velocity and the beam of the laser light is displaced radially of the disc by a tracking device forming part of the video disc player. The laser beam directed to the target track is reflected from the information-carrying face of the video disc or passed through the disc. The beam of light thus reflected from or passed through the video disc is converted into an electric reproducing signal by means of a photoelectric transducer unit for further conversion into video and audio signals.

As the beam of the laser light scanning the target track of the video disc is displaced radially of the information-carrying face of the disc, the frequency characteristic of the reproducing signal picked up from the video disc varies and the signal levels of high frequency components of the reproducing signal attenuate more in a central area than in an outer peripheral area of the disc. In order to compensate for such attenuation of the signal level, it has been proposed to provide signal correcting means in the reproduction network of an optical video disc player. The signal correcting means of this nature comprises an equalizer circuit adapted to produce an increased gain in the reproducing signal in response to the attenuated frequency components of the reproducing signal supplied to the equailizer network.

The signal level of the reproducing signal read out from an optically scanned video disc also unwantedly varies with the fluctuations in reflection rate of the scanned areas of the disc and the variation in the radiation power of the laser beam. The equalizer circuit in the known signal correcting means is not capable of compensating for such variation in the level of the reproducing signal and, for this reason, the attenuated high frequency components of the reproducing signal can not be corrected satisfactorily.

In the case of a video disc player of the capacitance scanning type, such unwanted variation in amplitude of the reproducing signal read out from the video disc may occur due to presence of small dusts on the surface of the video disc or fluctuations in dielectric constant along the tracks of the video disc.

A first important object of the present invention is, therefore, to provide a video-disc information reading and reproducing apparatus featuring an improved reproducing signal correcting device capable of properly compensating for the attenuation in the signal levels of high frequency components of the reproducing signal read out from a video disc without respect to variations in amplitude of the reproducing signal due to the fluctuations in the reflection rate or dielectric constant of the scanned areas of the disc, the variations in the radiation power of the laser beam, the presence of small dusts on the disc.

On the other hand, it sometimes happens that an optically scanned video disc has information recorded on only one face thereof. When such a video disc is put to use for playback purposes in a video disc player without knowing that the face of the video disc being scanned carries no recorded information, not only the information pickup system of the video disc player can not read out information but the various servo systems incorporated in the video disc player are held inoperative in the absence of the control signals which would be otherwise supplied to the servo systems. These servo systems include spindle and tangential servo systems to control the rotation of a video disc and tracking and focus servo system for controlling the path of the scanning laser beam directed at the target track of the video disc. When such servo systems are held inoperative with the video disc being driven for rotation, there would arise a danger that the mechanical driven member or members of any of the servo systems might be initiated into motion in an uncontrolled condition.

It is, for this reason, of especial importance to detect the presence or absence of recorded information on the face of the video disc being scanned. Such detection could be performed by the use of the output signals produced by the dropout detection circuit incorporated in an ordinary optical video disc player. Satisfactory results can not however be achieved by such an expedient because of the face that detecting dropouts of reproduced information is essentially different in effect from the detection of the presence or absence of recorded information on a video disc.

It is, accordingly, a second important object of the present invention to provide a video-disc information reading and reproducing apparatus including, in addition to the above mentioned reproducing signal correcting device, a device for detecting the presence or absence of recorded information on the face of a video disc.

A pick-up device of the video disc player is moved radially of the information-carrying face of the disc by the aid of the tracking servo system under the control of a tracking error signal indicative of the location of the reading or detecting point of the pick-up device with respect to the target track on the disc. The reading or detecting point corresponds to a scanning spot in the case of the optical video disc player. To control the tracking servo system reliably on the basis of such an error signal, it is important that the servo loop of the tracking servo system be closed when or after the detecting point is moved close to the target track on the video disc. If, in the case of the optical video disc player, the servo loop is closed and the servo system is locked in before the scanning spot of light is moved close to the target track, it may happen that the tracking mirror forming part of the optical pick-up system and operative to deflect the scanning beams in a radial direction of the video disc is abruptly initiated into motion to reach the target track and thus overshoots the target track. In an extreme case, the tracking mirror may be caused to oscillate and disable the tracking servo system form being locked in. Such an event may be caused not only during scanning of a video disc but generally when the servo loop of the tracking servo system is to be closed from an open condition.

It is, therefore, a third important object of the present invention to provide a video disc information reading and reproducing apparatus including an improved tracking servo system which can be locked in reliably and in a stable condition when the servo loop of the system is to be closed from an open condition.

SUMMARY OF THE INVENTION

With a view to achieving the first object of the present invention, there is provided a video-disc information reading and reproducing apparatus including a source of a reproducing signal read out from a video disc, comprising in combination, gain control means having an input terminal connected to the source of the reproducing signal and a control terminal and operative to automatically regulate the signal level of the reproducing signal in response to a control signal supplied to the aforesaid control terminal, equalizer means having an input terminal connected the gain control means and a control terminal and operative to produce an output signal having a gain which has a frequency characteristic variable in response to a control signal supplied to the control terminal of the equalizer means, first filter means for passing therethrough a frequency modulated video carrier component contained in the output signal from the equaliser means, second filter means for passing therethrough a frequency modulated audio carrier component contained in the output signal from the equalizer means, first signal level detector means for supplying to the control terminal of the equalizer means a control signal variable with the signal level of the video carrier component passed through the first filter means, and second signal level detector means for supplying to the control terminal of the gain control means a control signal variable with the signal level of the audio carrier component passed through the second filter means.

In order to accomplish the second object of the present invention, an apparatus according to the present invention further comprises comparing means having an input terminal connected to the second signal level detector means and an input terminal connected to a source of a reference signal having a predetermined level, the comparing means being operative to produce an output signal when the output signal delivered from the second signal level detector means is lower in level than the above mentioned reference signal.

For accomplishing the third object of the present invention, an apparatus according to the present invention further comprises a tracking servo system for deflecting the detecting point radially of the video disc, wherein the servo system comprises error signal producing means operative to produce a tracking error signal which is continuously variable in magnitude with the distance between the center line of a target track the video disc and a center point of the detecting point of the pick-up device and which has polarities respectively corresponding to the directions in which the pick-up device is to be moved radially of the video disc, comparing means for comparing the output signal from the second signal level detector means with a reference signal having a predetermined level for producing an output signal when the former is higher in level than the latter, control signal producing means responsive to the aforesaid tracking error signal and the output signal from the comparing means and operative to produce a control signal when the tracking error signal has a predetermined level in the presence of the output signal from the comparing means, and switch means provided in the servo loop of the tracking servo system and operative to close the servo loop in response to the control signal delivered from the control signal producing means.

The control signal producing means in the tracking servo system thus constructed and arranged may comprise a comparator circuit operative to compare the tracking error signal with a reference signal having a predetermined level and produce an output signal when the former is higher in level than the latter, a differentiator circuit for differentiating the output signal from the comparator circuit with respect to time, and gating means for passing therethrough the output signal from the differentiator circuit in the presence of the output signal from the comparing means for thereby producing the aforesaid control signal from the control signal producing means.

As an alternative, the control signal producing means included in the tracking servo system may comprise first and second comparator circuits concurrently responsive to the tracking error signal and operative to compare the tracking error signal with a reference signal having a predetermined level for producing output signals when the former is respectively higher and lower in level than the latter, a two-position switch shiftable between the first and second comparator circuits, a differentiator circuit having an input terminal selectively connected to the first and second comparator circuits across the two-position switch and operative to differentiate the output signal from selected one of the first and second comparator circuits with respect to time, and gating means for passing therethrough the output signal from the differentiator circuit in the presence of the output signal from the above mentioned comparing means for thereby producing the control signal from the control signal producing means.

On the other hand, the error signal producing means may, in the case of the optical video disc player, comprise means for emitting two index beams of light toward a target track on the video disc for producing two focused spots located in predetermined relationship to the focused spot of the scanning beam incident on the video disc, the relationship being such that the respective areas over which the focused spots of the two index beams incident on the video disc overlap the target track are substantially complemantary to each other.

BRIEF DESCRIPTION OF THE DRAWINGS

The drawbacks inhereint in prior-art optical video disc players and the features and advantages of an apparatus according to the present invention will be more clearly understood from the following description taken in conjunction with the accompanying drawings in which like reference numerals designate similar or corresponding components and in which:

FIG. 5A is a view schematically showing a basic concept in which the location of the scanning spot with respect to a target track of an optically scanned video disc is to be detected by the use of index beams of light for producing a tracking error signal for use in a tracking error system proposed by the present invention for incorporation into an optical vide disc player;

FIG. 5B is a graph showing an example of the waveform of the tracking error signal produced in the tracking servo system provided by the present invention;

FIG. 5C is a graph showing an example of the waveform of the audio carrier component extracted from the reproducing signal read out from an optically scanned video disc in an apparatus according to the present invention;

DETAILED DESCRIPTION OF THE PRIOR ART

Figure 1:
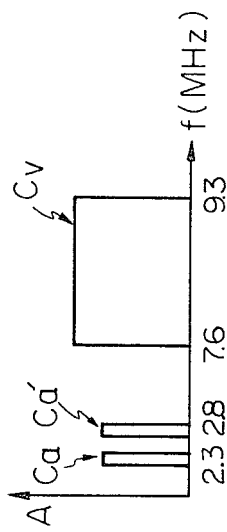
FIG. 1 is a graph showing a frequency spectrum of a reproducing signal optically read out from a video disc.

As previously discussed briefly, video and audio information recorded on a video disc is stored in a multiplex form consisting of a video signal carrier which is frequency modulated with, for example, a standard NTSC video signal and two-channel audio signal carriers each of which is frequency modulated with an audio signal. In this instance, the video signal carrier usually has a frequency sweep which ranges between 7.6 MHz corresponding to a black peak and 9.3 MHz corresponding to a white peak, while the two-channel audio signal carriers have carrier frequencies at 2.3 MHz and 2.8 MHz, respectively, each in a frequency band spanning between plus and minus 100 KHz from the carrier frequency, as indicated in the frequency spectrum illustrated in FIG. 1, the video signal carrier wave is represented by Cv and the two-channel audio signal carrier waves are represented by Ca and Ca', respectively.

Figure 2:
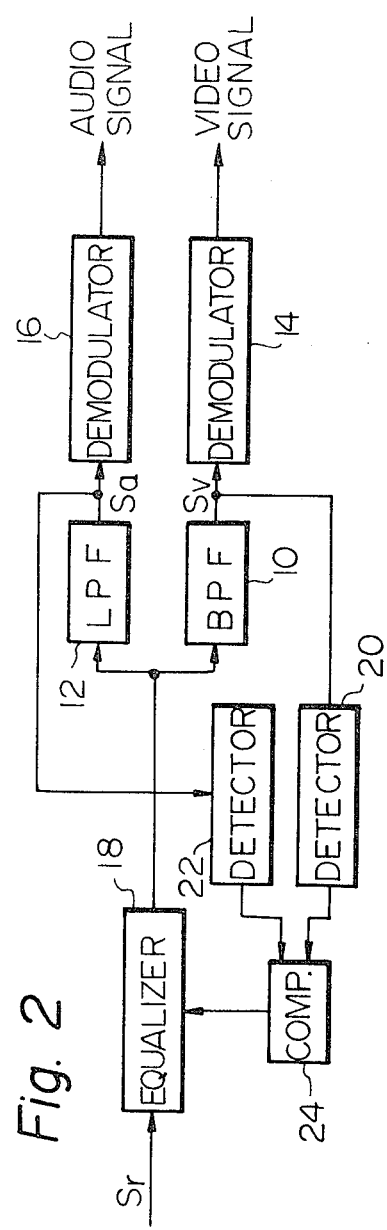
FIG. 2 is a block diagram showing a representative example of a prior-art signal correcting device incorporated in an optical video disc player.

During reproduction of the video and audio information thus optically, electrostatically or electromagnetically recorded on a video disc, the signal levels of high frequency components of the reproducing signal read out from the video disc are subject to attenuation as the reading or detecting point of the pick-up device approaches the central area of the disc. For the purpose of compensating for such attenuation of the high frequency components of the reproducing signal, it has been proposed to provide a signal correcting device in the reproduction network of a video disc player. FIG. 2 diagrammatically shows a representative example of the reproduction network including such a signal correcting device in a prior-art video disc player.

Referring to FIG. 2, the reproduction network of a known video disc player comprises a bandpass filter 10 (BPF) and a low-pass filter 12 (LPF). The bandpass and low-pass filters 10 and 12 have respective input terminals connected in parallel to a source (not shown) of a reproducing signal Sr. The reproducing signal Sr picked up from a video disc is thus fed to the bandpass and low-pass filters 10 and 12 and is divided into two frequency modulated carrier components consisting of a video carrier component Sv having frequencies higher than a predetermined video cut-off frequency and an audio carrier component Sa having frequencies lower than a predetermined audio cut-off frequency. The audeo cut-off frequency is lower than or equal to the video cut-off frequency. The video and audio carrier components thus delivered from the bandpass and low-pass filters 10 and 12 are supplied to first and second demodulators 14 and 16, respectively, for extracting video and audio signals from the demodulated carrier components. Though not shown in the drawings, the source of the reproducing signal Sr is incorporated in an optical information pickup system including laser beam emitters and an optical lens/mirror system, as is well known in the art, in the case of an optical video disc player.

The signal correcting device incorporated in the reproduction network thus constructed and arranged comprises an equalizer circuit 18 having a control terminal and connected between the source of the reproducing signal Sr and the parallel combination of the bandpass and low-pass filters 10 and 12. The signal correcting device further comprises first and second signal level detectors 20 and 22 having input terminals connected to the output terminals of the bandpass and low-pass filters 10 and 12, respectively. The first and second signal level detectors 20 and 22 are thus operative to detect the signal levels of the video and audio carrier components Sv and Sa delivered from the bandpass and low-pass filters 10 and 12, respectively, and to produce output signal which are variable with the signal levels thus detected. The output signals respectively delivered from the first and second level detectors 20 and 22 are supplied to a comparator circuit 24 having an output terminal connected to the control terminal of the equalizer circuit 18. The comparator circuit 24 is operative to compare the respective output signals from the first and second signal level detectors 20 and 24 with each other and to control the equalizer circuit 18 in such a manner as to produce an increased gain at high frequencies when the signal level of the signal level of the video signal component Sv is found to be decreasing as compared with the signal level of the audio signal components Sa.

As pointed out previously, the signal correcting device of the above described nature has a drawback in that the equalizer circuit forming part of such a device can not take up the unwanted variation in amplitude of the reproducing signal Sr as caused by the fluctuations in the coefficients of reflection or the dielectric constant of an information-carrying face of a video disc, the variation in the radiation output of the laser beam scanning the information-carrying face of the disc, etc.

DESCRIPTION OF THE FIRST PREFERRED EMBODIMENT

Figure 3:
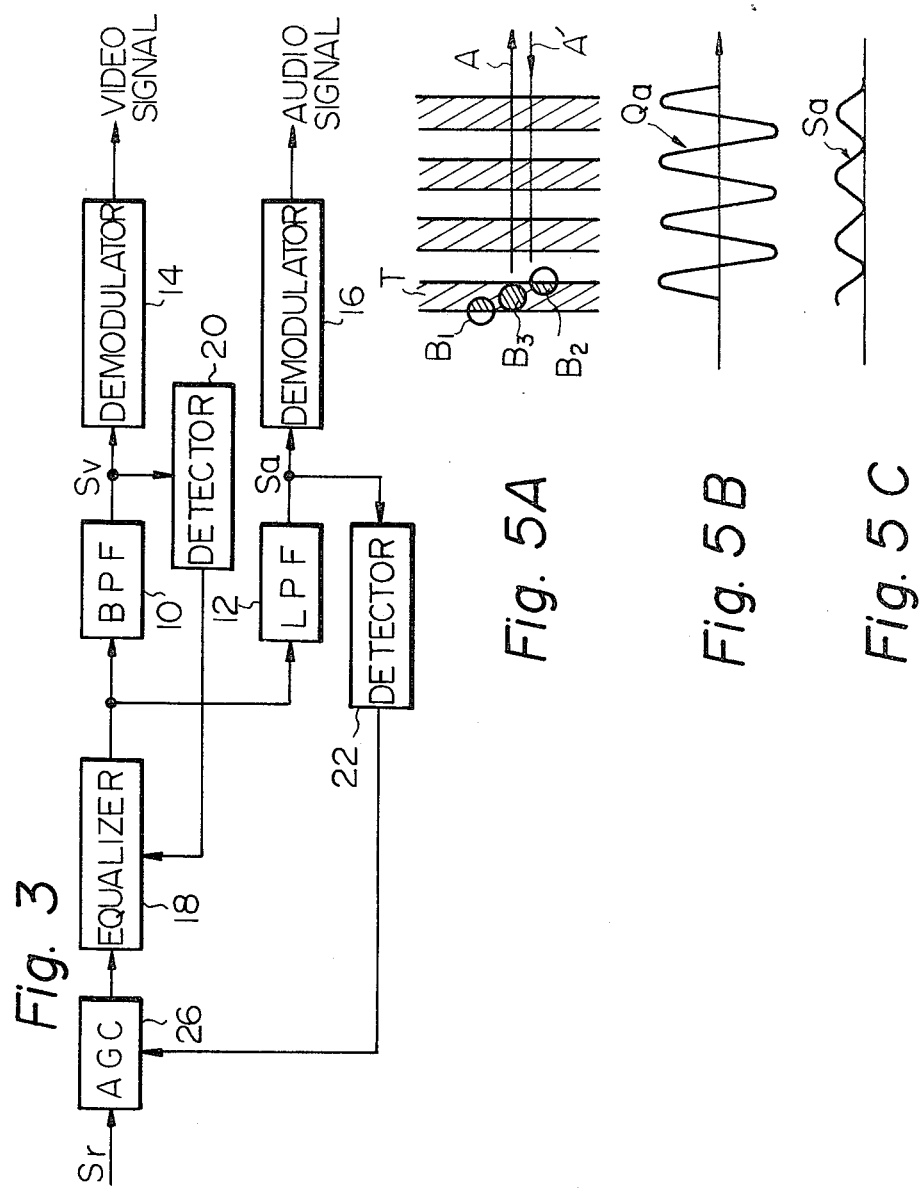
FIG. 3 is a block diagram showing a preferred embodiment of a signal correcting device incorporated in an apparatus according to the present invention.

FIG. 3 shows the preferred embodiment of the present invention to eliminate such a drawback of the signal correcting device incorporated in the reproduction network hereinbefore described with reference to FIG. 2. In FIG. 3, the reproduction network per se is shown constructed similarly to that illustrated in FIG. 2 and, thus, comprises bandpass and low-pass filters 10 and 12 and first and second demodulator circuits 14 and 16 having input terminals connected to the output terminals of the bandpass and low-pass filters 10 and 12, respectively. The bandpass and low-pass filters 10 and 12 provided in the embodiment of the present invention constitute first and second filter means adapted to pass therethrough currents having frequencies higher and lower than predetermined cut-off frequencies, respectively. The bandpass filter 10 constituting the first filter means may therefore be substituted by a high-pass filter (not shown). The bandpass and low-pass filters 10 and 12 have respective input terminals jointly connected to a source (not shown) of a reproducing signal Sr through an equalizer circuit 18.

Also similarly to its counterpart in the reproduction network shown in FIG. 2, the signal correcting device provided in the reproduction network illustrated in FIG. 3 comprises first and second signal level detectors 20 and 22 having input terminals connected to the output terminals of the bandpass and low-pass filters 10 and 12, respectively. In the reproduction network shown in FIG. 3, the first signal level detector 20 has an output terminal connected to the control terminal of the equalizer circuit 18 while the second signal level detector 22 has an output terminal connected to a control terminal of an automatic gain control circuit 26 (AGC) which is provided in accordance with the present invention to make up for the imperfections of the equalizer circuit 18.

The automatic gain control circuit 26 is connected between the source of the reproducing signal Sr and the input terminal of the equalizer circuit 18 and is constituted by a gain-controlled amplifier adapted to produce a gain which is variable in response to the signal imparted to the control terminal thereof. Controlled by the signal delivered from the second signal detector 22, the automatic gain control circuit 26 is thus operative to produce an output signal having a substantially fixed signal level corresponding to the signal level of the audio carrier component Sa irrespective of the variation, if any, in the signal level of the original reproducing signal Sr supplied to the gain control circuit 26. On the other hand, the signal which is supplied from the second signal level detector 20 to the control terminal of the equalizer circuit 18 varies the frequency characteristic of the gain produced in the equalizer circuit 18.

Since the audio carrier component Sa extracted from the signal thus delivered from the equalizer circuit 18 has relatively low frequencies, the signal level thereof remains substantially constant throughout the radius of an information-carrying face of a video disc. The signal level of the reproducing signal Sr supplied to the automatic gain control circuit 26 is regulated on the basis of such a constant signal level of the audio carrier component Sa. The reproducing signal supplied through the equalizer circuit 18 to the reproduction network of the embodiment shown in FIG. 3 has, for this reason, a constant amplitude notwithstanding the influences of the fluctuations in the coefficients of reflection of an information-carrying face of a video disc, the variation in the radiation output of the laser beam to scan the video disc, or the like. The performance characteristic of the equalizer circuit 18 can be therefore controlled properly simply on the basis of the signal level of the video carrier component Sv so as to accurately compensate for the attenuation in the signal levels of the high frequency components of the reproducing signal Sr picked up from a central area of an information-carrying face of a video disc.

DESCRIPTION OF THE SECOND PREFERRED EMBODIMENT

Figure 4:
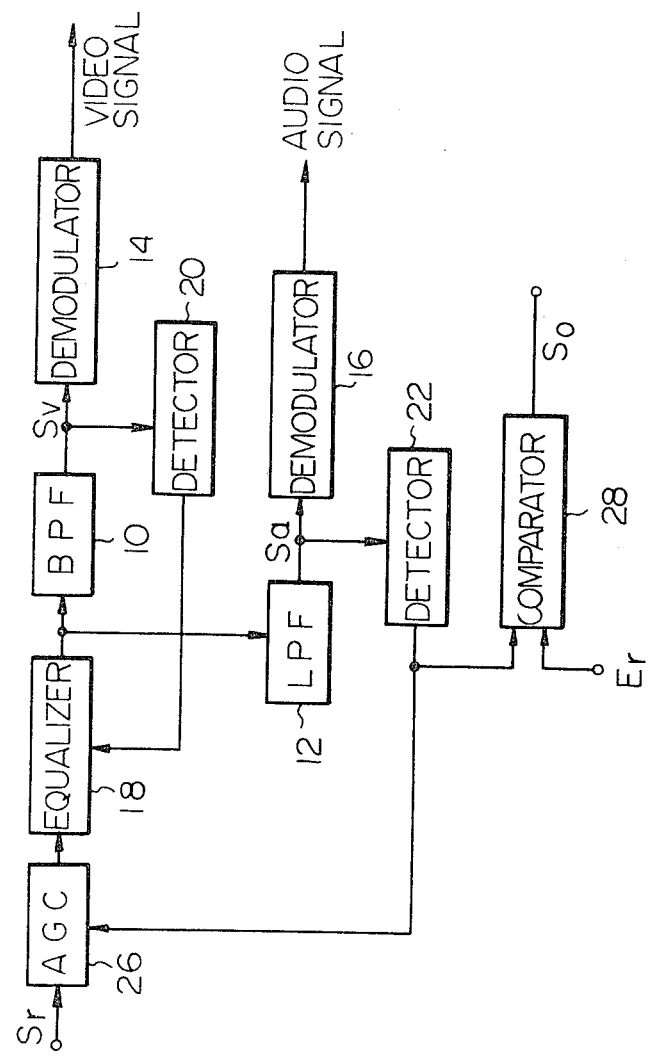
FIG. 4 is a block diagram showing a device for detecting the presence or absence of recorded information on an optically scanned video disc to be played back in an apparatus according to the present invention.

Turning to FIG. 4, the second embodiment of the present invention is characterized by a device for detecting the presence or absence of recorded information on the scanned face of a video disc. Such a device is provided in combination with a signal correcting device similar to that incorporated in the embodiment of FIG. 3. Thus, the embodiment shown in FIG. 4 includes all the circuit components of the embodiment of FIG. 3 and comprises filters 10 and 12, demodulators 14 and 16, an equalizer circuit 18, signal level detectors 20 and 22 and an automatic gain control circuit 26, all of which are arranged similarly to their respective counterparts in the embodiment of FIG. 3. The embodiment of FIG. 4 is thus also based on the discovery that the audio carrier component Sa contained in the original reproducing signal Sr has relatively low frequencies as compared with those of the video carrier component Sv and therefore has a substantially constant signal level throughout the radius of the scanned face of a video disc. The intent of the embodiment of FIG. 4 is therefore to detect the presence or absence of recorded information on the scanned face of a video disc through detection of the signal level of the audio carrier component Sa of the reproducing signal Sr so that the presence or absence of the recorded information or of the scanned track on an information-carrying face of a video disc can be detected accurately without respect to the radial location of the reading or detecting point on the disc.

For this purpose, the embodiment of FIG. 4 further comprises a two-input comparator circuit 28 having one input terminal connected to the output terminal of the second signal level detector 22. The comparator circuit 28 is thus constantly supplied with a signal variable with the signal level of the audio signal component Sa delivered from the low-pass filter 12. The other input terminal of the comparator circuit 28 is connected to a source (not shown) of a reference signal which is herein assumed to be supplied in the form of a predetermined voltage Er approximating a ground potential. Though not shown in detail, the comparator circuit 28 is constructed and arranged so that an output signal So is delivered therefrom when the voltage level of the signal supplied from the second signal level detector 22 is higher than the predetermined reference voltage Er.

In the presence of audio information in the scanned track of a video disc, the signal delivered from the second signal level detector 22 is higher than the ground potential Er so that the comparator circuit 28 produces the signal So at its output terminal. In the absence, however, of audio information in the scanned track or at the end of the scanned track on an information-carrying face of a video disc, there is no output signal delivered from the second signal level detector 22. Under this condition, the comparator circuit 28 can not produce the output signal So. If there is no audio information in the presence of video information in the scanned track of a video disc, then audio carriers carrying no audio signals are fed from the low-pass filter 12 and enable the second signal level detector 22 to deliver an outut signal having a certain voltage level higher than the reference voltage Er which is close to the ground potential. Under this condition, the comparator circuit 28 also produces the signal So at its output terminal.

DESCRIPTION OF THE THIRD PREFERRED EMBODIMENT

In order to produce signals to control the tracking and focus servo systems incorporated in an optical video disc player, two index beams of laser light are radiated onto the information-carrying face of the video disc being scanned by a scanning laser beam. The three beams of laser light are focused at points located in predetermined relationship to each other on the information-carrying face of the video disc being played back. FIG. 5A shows an example of such a relationship among the respective focused spots of these three beams, wherein the focused spots of the index beams ae denoted by $B_1$ and $B_2$ and the focused spot of the scanning beam is denoted by $B_3$. In the example herein shown, the three beams are assumed to be directed toward a target track T so that one of the focused spots $B_1$ and $B_2$ of the index beams overlaps the target track T over one half area of the spot and the other focused spot overlaps the target track T over the other half area of the spot when the focused spot $B_3$ of the scanning beam is correctly located on the target track T. When the focused spots $B_1$, $B_2$ and $B_3$ of the index and scanning beams are thus located with respect to the target track T, the signal level of the reproducing signal resulting from the light beam reflected from or passed through the focused spot $B_3$ of the scanning beam peaks up. If, furthermore, a tracking error signal is produced through detection of the difference between the levels of the signals produced from the light beams reflected from or passed through the focused spots $B_1$ and $B_2$ of the index beams, the error signal assumes a zero value when the focused spots $B_1$ and $B_2$ are located as illustrated in FIG. 5A since the levels of such signals are substantially equalized under such a condition.

If the scanning beam is then moved radially of the video disc in one direction perpendicular to the target track T as indicated by arrow A in FIG. 5A, the level of the tracking error signal will vary sinusoidally as indicated by curve Qa in FIG. 5B as the scanning beam is moved from one of the parallel tracks or track portions to another. The level of the sinusoidal wave Qa varies in proportion to the distance between the center point of the focused spot $B_3$ of the scanning beam and center line of the target track closest to the focused spot $B_3$. On the other hand, the polarities of the signal indicated by the sinusoidal wave Qa corresponds to the directions in which the focused spot $B_3$ of the scanning beam is moving toward and away from the target track. FIG. 5C shows an example of the waveform of the reproducing signal Sr read out from the target track thus scanned.

In controlling the tracking servo system reliably on the basis of the tracking error signal Qa produced in the above described manner, it is important that the servo loop of the tracking servo system be closed when the focused spot $B_3$ of the scanning beam is moved close to the target track. If the servo loop is closed when the focused spot $B_3$ of the scanning beam is located far ahead of the target track T or, in other words, the tracking error signal Qa is at a relatively high level, the tracking mirror to deflect the scanning beam in a radial direction of the video disc is abruptly initiated into motion attempting to reach the target track T and may overshoot the target track. In an extreme case, the tracking mirror may be caused to oscillate violently and disable the servo system from being locked in. The third embodiment of the present invention is intended to provide an improved tracking servo system which can be locked in quickly, smoothly and reliably in a stable condition when the servo loop of the system is to be closed from an open condition.

Figure 6:
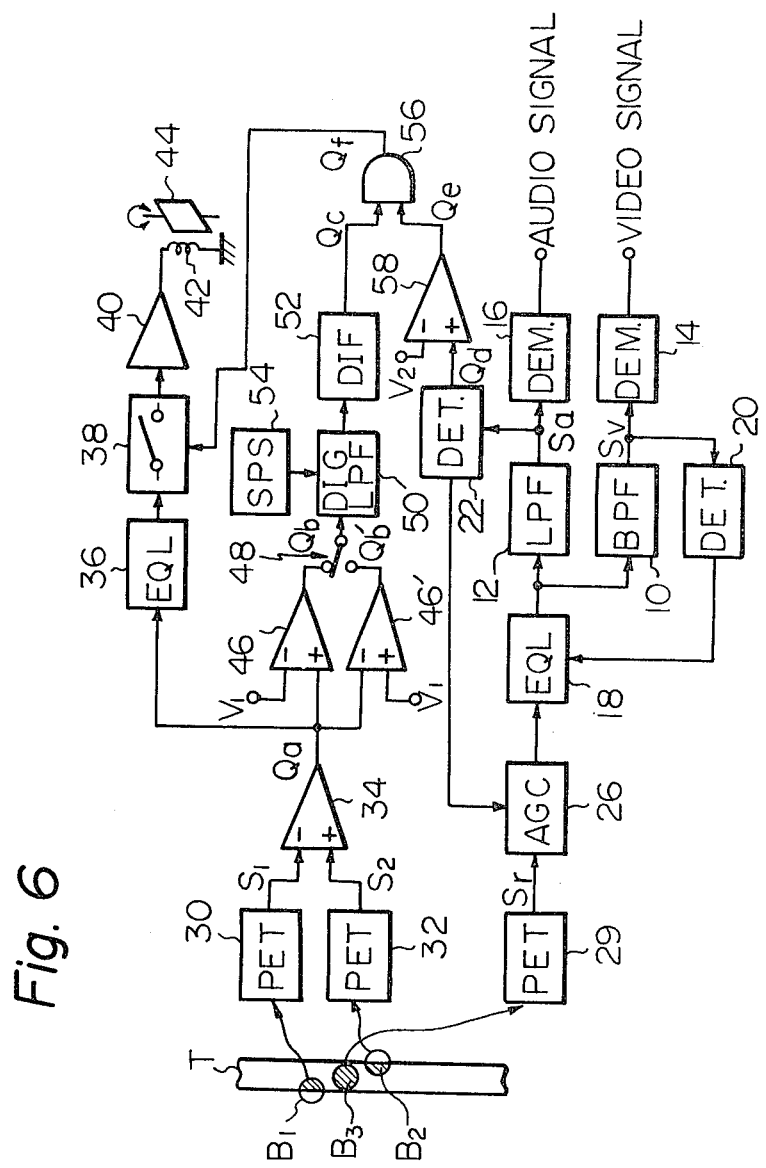
FIG. 6 is a block diagram showing the circuit arrangement of the tracking servo system proposed by the present invention.

Referring to FIG. 6 of the drawings, the servo loop of such an improved servo system is assumed, by way of example, to be provided in combination with a signal correcting device comprising an equalizer circuit 18, signal level detectors 20 and 22 and an automatic gain control circuit 26 (AGC). These equalizer circuit 18, signal level detectors 20 and 22 and automatic gain control circuit 26 are constructed and arranged similarly to their respective counterpart in the embodiment of FIG. 3 in combination with bandpass and low-pass filters 10 and 12 and first and second demodulators 14 and 16 which are also arranged similarly to their respective counterparts in the embodiment of FIG. 3. In FIG. 6, furthermore, the source of the reproducing signal Sr is shown constituted by a photoelectric transducer unit 29 which is adapted to electrically pick up the information read out by the scanning beam or spot incident on a video disc.

Now, the servo loop of the tracking servo system provided in combination with such a signal correcting device comprises a pair of, first and second photoelectric transducer units 30 and 32. These transducer units 30, 32 and 34 are mounted on a pick-up unit (not shown) which further includes an optical system for delivering therethrough three light beams emitted from light sources to the information-carrying face of the video disc and for relaying the reflected light beam th the transducer units 30, 32 and 34. The transducer units 30 and 32 are responsive to the beams of light reflected from or passed through the focussed spots $B_1$ and $B_2$, respectively, of the index laser beams and are operative to produce output signals $S_1$ and $S_2$, respectively. The signals $S_1$ and $S_2$ have signal levels respectively proportional to the areas over which the focussed spots $B_1$ and $B_2$ of the index laser beams overlap the target track T on the video disc being played back, as will be understood from the description previously made with reference to FIG. 5A.

Figure 7A:
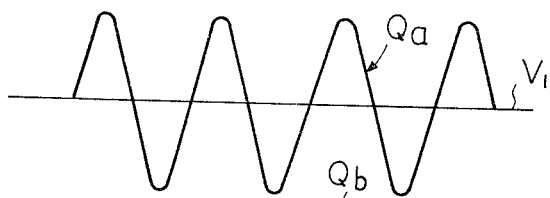
FIGS. 7A to 7G are graphs showing various waveforms appearing in the circuit arrangement shown in FIG. 6.
Figure 7B:
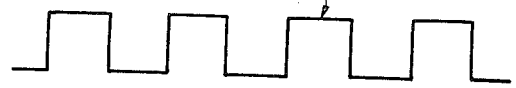

The output signals $S_1$ and $S_2$ thus delivered from the first and second photoelectric transducer units 30 and 32 are fed to subtractor means which is shown constituted by a differential amplifier 34 having two input terminals connected to the respective output terminals of the transducer units 30 and 32. The differential amplifier 34 is adapted to process the signals $S_1$ and $S_2$ as, for example, the subtrahend and minuend, respectively, and thereby produce an output signal indicative of the difference between the levels of the signals $S_1$ and $S_2$. The output signal produced by the differential amplifier 34 is, thus, the above mentioned tracking error signal Qa and varies sinusoidally as shown in FIG. 7A as the scanning beam is displaced radially of the information-carrying face of the video disc in a direction indicated by the arrow A in FIG. 5A. The differential amplifier 34 has an output terminal connected through a equalizer circuit 36 and across a switch 38 to an amplifier 40 having an output terminal connected to a driver coil 42 for a tracking mirror 44. The tracking mirror 44 is pivotable about an axis fixed in the tracking unit of the optical video disc player. The tracking loop shown in FIG. 6 further comprises first and second comparing means which are constituted by first and second comparator circuits 46 and 46' each having two, positive and negative input terminals. The positive input terminal of the first comparator circuit 46 and the negative input terminal of the second comparator circuit 46' are connected jointly to the output terminal of the differential amplifier 34, while the negative input terminal of the first comparator circuit 46 and the positive input terminal of the second comparator circuit 46' are connected to a source or sources of a predetermined reference voltage $V_1$ as shown. Thus, the first comparator circuit 46 is operative to compare the level of the signal Qa with the reference voltage $V_1$ and produce pulse signals Qb when the former is higher than the latter. If, in this instance, the reference voltage $V_1$ is selected at the level of a ground potential as indicated in FIG. 7A, then the waveform of the pulse signals Qb appearing at the output terminal of the first comparator circuit 46 becomes such that is shown in FIG. 7B. On the other hand, the second comparator circuit 46' is operative to compare the level of the output signal Qa from the differential comparator 34 with the predetermined reference voltage $V_1$ and produce pulse signals Qb' when the former is lower than the latter.

Figure 7C:
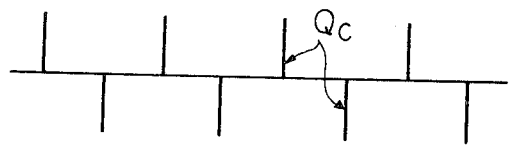

The respective output terminals of the first and second comparator circuits 46 and 46' thus arranged are connected across a two-position switch 48 and through a digital low-pass filter 50 (LPF) to the input terminal of a differentiator circuit 52. The digital low-pass filter 50 may be realized by using a retrigerrable monostable multivibrator. The two-position switch 48 controlled to selectively provide connection between the first comparator circuit 46 and the low-pass filter 50 when the pick-up unit producing the scanning beam or spot is moved in the direction of the arrow A shown in FIG. 5A, or connection between the second comparator circuit 46' and the low-pass filter 50 when the pick-up unit and accordingly the scanning beam or spot is moved in the opposite direction indicated by A' in FIG. 5A. The pulse signals Qb or Qb' delivered respectively from the first or second comparator circuit 46 or 46' and passed through the two-position switch 48 and the low-pass filter 50 is differentiated with respect to time in the differentiator circuit 52. Thus, the differentiator circuit 52 produces impulse signals Qc indicated in FIG. 7C when the two-position switch 48 is in a position providing connection from the first comparator circuit 46 to the low-pass filter 50 as shown in FIG. 6. The digital low-pass filter 50 is provided for the purpose of enabling the tracking servo system to be locked in at low frequencies of the tracking error signal Qa because the servo system might be disabled from being locked in when the tracking error signal Qa occurs at excessively high frequencies. When the scanning or deflecting rate of the detecting point is increased, the cut-off frequency of the low-pass filter 50 is also increased with the increase in the deflecting rate. For this purpose, the low-pass filter 50 has a cut-off frequency control terminal connected to a scanning rate shifter 54 so that the cut-off frequency of the filter is variable with the scanning rate selected by the scanning rate shifter 54.

The impulse signal Qc delivered from the differentiator circuit 52 are fed to one input terminal of a two-imput logic "AND" gate circuit 56. The other input terminal of the "AND" gate circuit 56 is connected to the output terminal of third comparing means which is shown constituted by a comparator circuit 58 having positive and negative input terminals. The negative input terminal of the comparator circuit 58 is connected to a source of a predetermined reference voltage $V_2$, while the positive input terminal of the comparator circuit 58 is connected to the second signal detector 22 of the previously described signal correcting devide incorporated in the reproduction network as shown.

In the embodiment illustrated in FIG. 6, the second signal level detector 22 of the signal correcting device has a first output terminal connected to the control terminal of the automatic gain control circuit 26 and a second input terminal connected to the positive input terminal of the above mentioned comparator circuit 58. Though not shown in the drawings, furthermore the second signal level detector 22 of the signal correcting device is largely composed of an envelope detector for detecting the envelope of the frequency modulated audio signal carrier Sa delivered from the low-pass filter 12 and a smoother circuit for converting the output signal of the envelope detector into a signal for controlling the automatic gain control circuit 26. The output terminal of the smoother circuit constitutes the above mentioned first input terminal of the signal level detector 22 and the output terminal of the envelope detector constitutes the above mentioned second output terminal of the signal level detector 22. To the positive terminal of the comparator circuit 58 is thus impressed a signal Qd indicative of the envelope of the frequency modulated audio signal carrier Sa. An example of the waveform of such a signal Qd is indicated in FIG. 7D.

Figure 7D:
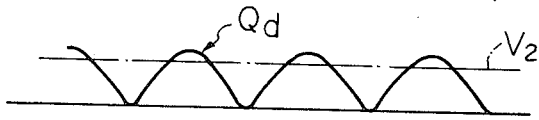
Figure 7E:
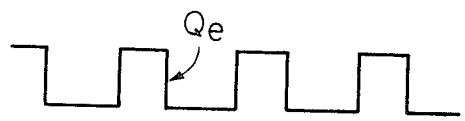
Figure 7F:
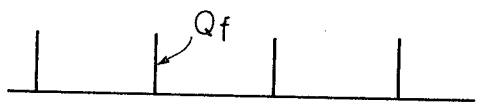

The comparator circuit 58 is adapted to compare the level of the output signal Qd from the signal level detector 22 with the reference voltage $V_2$ and produce a series of positive pulse signals Qe when the former is higher than the latter as will be seen from FIGS. 7D and 7E. The pulse signals Qa are fed to one input terminal of the logic "AND" gate circuit 56 so that the impulse signals Qc supplied from the differentiator circuit 52 are selectively passed through the "AND" gate circuit 56 as indicated by Qf in FIG. 7F in the presence of the pulse signals Qe from the comparator circuit 58. The output terminal of the "AND" gate circuit 56 is connected to a control terminal of the switch 38.

The leading and trailing edges of the pulse signals Qb supplied from the first comparator circuit 46 correspond to the zero value of the tracking error signal Qa produced when the scanning beam is deflected in the direction of the arrow A in FIG. 5A. More specifically, each of the trailing edges of the pulse signals Qb indicates that the focused spot $B_3$ of the scanning beam is correctly located on each of the tracks or track portions shown in FIG. 5A while each of the leading edges of the pulse signals Qb indicates that the focussed spot $B_3$ of the scanning beam is located centrally between every adjacent two of the tracks or track portions. Supplied with such pulse signals Sb, the differentiator circuit 52 produces alternately positive and negative impulse signals Qc which are positive in response to the trailing edges of the pulse signals Qb and which are negative in response to the leading edges of the pulse signals Qb.

On the other hand, the pulse signals Qe supplied from the comparator circuit 58 indicate that the frequency modulated audio signal carrier Sa is at peak levels or close to the peak levels and that the detecting point is positioned on or around the center of a track on a video disc. Such pulse signals Qe thus indicating existance of a track are fed as gate signals to the "AND" gate circuit 56 so that only the positive ones of the impulse signals Qc are passed through the "AND" gate circuit 56. Thus, each of the impulse signals Qf delevered from the "AND" gate circuit 56 occurs when the amount of tracking error is minimum and concurrently the audio signal carrier Sa is at or close to a peak value. The switch 58 is closed at such a timing so that the tracking servo system can be locked in accurately and reliably.

It may be mentioned that the tracking servo system can be locked in not only in the presence of an audio information in the original reproducing signal Sr but also in the absence of an audio information in the reproducing signal Sr in case the reproducing signal Sr contains only video information. This is because of the fact that the reproducing signal Sr containing video information contains an audio carrier although the audio carrier may not carry any audio information.

Figure 7G:
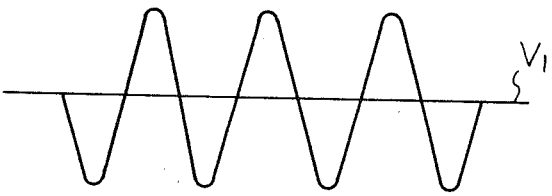

When the pick-up unit is deflected to move in a direction indicated by the arrow A' in FIG. 5A with respect to the tracks or track portions on a video disc, the two-position switch 48 is shifted to a position providing connection from the second comparator circuit 46' to the low-pass filter 50. Under such a condition, the tracking error signal delivered from the differential amplifier 34 takes a waveform shown in FIG. 7G so that the pulse signals Qb' produced by the second comparator circuit 46' appear in a waveform similar to the waveform of the pulse signals Qb shown in FIG. 7B. The circuit components subsequent to the comparator circuit 46' thus operate similarly to those connected to the first comparator circuit 46.

Although it has been assumed that the servo loop of the embodiment of FIG. 6 is closed during scanning of the tracks on a video disc, the servo loop is controlled in a similar manner when the loop is to be closed during other operational conditions.

Figure 8:
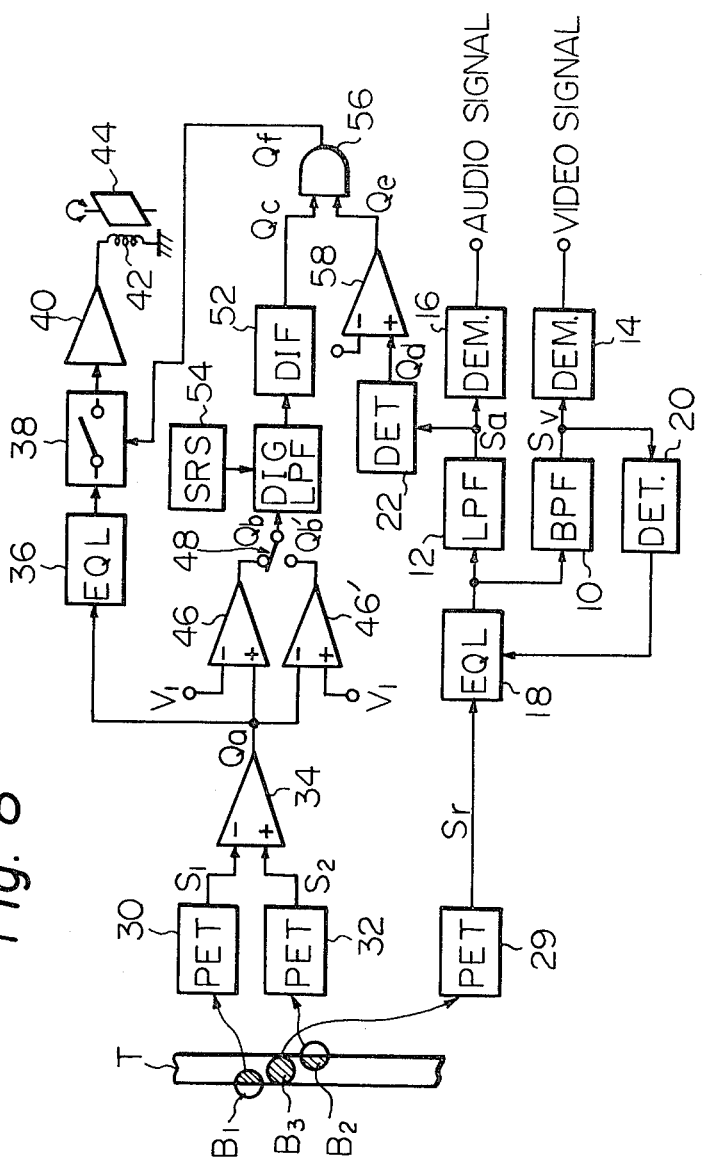
FIG. 8 is a block diagram showing a modification of the tracking servo system illustrated in FIG. 6.

While, furthermore, it has been assumed that the tracking servo system embodying the present invention is provided in combination with the signal correcting device including the automatic gain control circuit 26, viz., forming part of the embodiment of FIG. 3, such a system can be provided in combination with a prior-art signal correcting device of the nature shown in FIG. 2, viz., a signal correcting device which is devoid of the automatic gain control circuit. FIG. 8 shows such an embodiment of the present invention.

In the embodiment illustrated in FIG. 8, the second signal level detector 22 forming part of the signal correcting device is constituted by an envelope detector circuit adapted to detect the envelope of the frequency modulated audeo signal carrier Sa delivered from the preceding low-pass filter 12. The output terminal of such an envelope detector circuit constitutes the output terminal of the signal level detector 22 per se and is connected solely to the positive input terminal of the comparator circuit 58.

What is claimed is:

1. A video-disc information reading and reproducing apparatus including a source of a reproducing signal read out from a video disc, comprising in combination;

gain control means having an input terminal connected to said source and a control terminal and operative to automatically regulating the signal level of said reproducing signal in response to a control signal supplied to said control terminal;

equalizer means having an input terminal connected to said gain control means and a control terminal and operative to produce an output signal having a gain which has a frequency characteristic variable in response to a control signal supplied to the control terminal of the equalizer means;

first filter means for passing therethrough a frequency modulated video carrier component contained in the output signal from said equalizer means;

second filter means for passing therethrough a frequency modulated audio carrier component contained in the output signal from said equalizer means;

first signal level detector means for supplying to the control terminal of said equalizer means control signal variable only with the signal level of said video carrier component; and second signal level detector means for supplying to the control terminal of said gain control means a control signal variable only with the signal level of said audio carrier component.

2. An apparatus as set forth in claim 1, further comprising comparing means having an input terminal connected to said second signal level detector means and an input terminal connected to a source of a reference signal having a predetermined level, said comparing means being operative to produce an output signal when the output signal delivered from said second signal level detector means is lower in level than said reference signal.

3. An apparatus as set forth in claim 1, further comprising a tracking servo system for positioning a detecting point of the pick-up device thereof radially of said video disc, the servo system comprising:

error signal producing means operative to produce a tracking error signal which is continuously variable in magnitude with the distance between the center line of a target track on said video disc and the detecting point to be positioned on said target track and which has polarities respectively corresponding to the directions in which the pick-up device is to be deflected radially of the video disc, comparing means for comparing the output signal from said second signal level detector means with a reference signal having a predetermined level for producing a track existance signal when the former is higher in level than the latter, control signal producing means responsive to said tracking error signal and said output signal from said comparing means and operative to produce a loop closure control signal when said tracking error signal has a predetermined level in the presence of said track existance signal from the comparing means, and provided in the servo loop of said tracking servo system and operative to make operative the servo loop in response to the loop closure control signal so as to perform quick and smooth lock-in operation.

4. An apparatus as set forth in claim 3, in which said control signal producing means comprises first and second comparator circuits concurrently responsive to said tracking error signal and operative to compare the tracking error signal with a reference signal having a predetermined level close to ground potential for producing output signals when the former is respectively higher and lower in level than the latter, a two-position switch shiftable between said first and second comparator circuits, a differentiator circuit having an input terminal selectively connected to said first and second comparator circuits across said two-position switch and operative to differentiate the output signal from selected one of the first and second comparator circuits with respect to time, and gating means for passing therethrough the output signal from said differentiator circuit in the presence of the output signal from said comparing means for producing said control signal from said control signal producing means.

5. An apparatus as set forth in claim 4, in which said control signal producing means further comprises a low-pass filter connected between said two-position switch and said differentiator circuit.

6. An apparatus as set forth in claim 3 or 4, in which said error signal producing means comprises means for emitting two index beams of light toward a target track on said video disc for producing two focused spots located in predetermined relationship to the focused spot of the scanning beam incident on said video disc, said relationship being such that the respective areas over which the focused spots of the index beams incident on the video disc overlap the target track are substantially complementary to each other.

7. An apparatus as set forth in claim 6, in which said error signal producing means further comprise two photoelectric transducer means which are respectively operative to produce output signals continuously variable with said areas, and subtractor means for producing as said tracking error signal an output signal continuously variable with the difference between the respective levels of the output signals from said transducer means.

8. In a video-disc information reading and reproducing apparatus including a source of a reproducing signal read out from a video disc scanned by a detecting point which is deflected radially of the video disc and a signal correcting device which is operative to compensate for the attenuation of the signal level of high frequency components of said reproducing signal and which includes signal level detector means operative to produce an output signal variable with the signal level of a frequency modulated audio carrier component contained in the reproducing signal, a tracking servo system for deflecting said detecting point radially of said video disc, the tracking servo system comprising error signal producing means operative to produce a tracking error signal which is continuously variable in magnitude with the distance between the center line of a target track on said video disc and said detecting point to be placed on said target track and which has polarities respectively corresponding to the directions in which the said detecting point is to be deflected radially of the video disc, comparing means for comparing the output signal having a predetermined level for producing a track existance signal when the former is higher in level than the latter, control signal producing means responsive to said tracking error signal and said output signal from said comparing means and operative to produce a loop closure control signal when said tracking error signal has a predetermined level in the presence of said track existance signal from the comparing means, and switch means provided in the servo loop of said tracking servo system and operative to make operative the servo loop in response to the loop closure control signal so as to perform quick and smooth lock-in operation.

9. A tracking servo system as set forth in claim 8, in which said control signal producing means comprises first and second comparator circuits concurrently responsive to said tracking error signal and operative to compare the tracking error signal with a reference signal having a predetermined level close to ground potential for producing output signals when the former is respectively higher and lower in level than the latter, a two-position switch shiftable between said first and second comparator circuits, a differentiator circuit having an input terminal selectively connected to said first and second comparator circuits across said two-position switch and operative to differentiate the output signal from selected one of the first and second comparator circuits with respect to time, and gating means for passing therethrough the output signal from said differentiator circuit in the presence of the output signal from said comparing means for producing said control signal from said control signal producing means.

10. A tracking servo system as set forth in claim 9, in which said control signal producing means further comprises a low-pass filter connected between said two-position switch and said differentiator circuit.

11. A tracking servo system as set forth in claim 10, in which said control signal producing means further comprises means for varying the cut-off frequency of said low-pass filter in accordance with the rate at which said scanning beam is deflected radially of said video disc.

12. A tracking servo system as set forth in claim 9, in which said information reading and reproducing apparatus is of the optically scanning type adapted to scan said video disc by a scanning beam of light and in which said error signal producing means comprises means for emitting two index beams of light toward a target track on said video disc for producing two focused spots located in predetermined relationship to the focused spot of the scanning beam incident on said video disc, said relationship being such that the respective areas over which the focused spots of the index beams incident on the video disc overlap the target track are substantially complimentary to each other.

13. A tracking servo system as set forth in claim 12, in which said error signal producing means further comprises two photoelectric transducer means which are respectively operative to produce output signals continuously variable with said areas, and subtractor means for producing as said tracking error signal an output signal continuously variable with the difference between the respective levels of the output signals from said transducer means.

* * * * *